United States Patent
Brill et al.

[15] 3,707,253
[45] Dec. 26, 1972

[54] VARIABLE PROJECTOR SPEED CONTROL

[72] Inventors: Henry L. Brill, Flushing, N.Y.; James A. Stanford, East Orange, N.J.

[73] Assignee: E. R. E. Laboratory, Inc., West Orange, N.J.

[22] Filed: Aug. 31, 1971

[21] Appl. No.: 176,517

[52] U.S. Cl. ..................226/76, 226/157, 226/178, 352/180
[51] Int. Cl. ..............................................G03b 1/24
[58] Field of Search................226/76, 152, 157, 178; 352/180, 181

[56] References Cited

UNITED STATES PATENTS

| | | | |
|---|---|---|---|
| 2,173,830 | 9/1939 | Eitzen | 226/157 X |
| 3,610,495 | 10/1971 | Murayama | 226/76 |

Primary Examiner—Richard A. Schacher
Attorney—George H. Firtzinger

[57] ABSTRACT

A film projector is stepped ahead by a ratchet mechanism operated by a rotating cam itself driven from a motor through a one-revolution integrating clutch. The clutch is controlled by a solenoid which when continuously energized causes the clutch to be continuously engaged and the film to be advanced at a maximum speed of about 22 frames per second. Lower projector speeds down to one frame every two seconds are accomplished by cutting off the steady current supply to the solenoid and operating it by a pulse generator. An RC timing circuit for the generator has a manually variable rheostat which at zero setting (minimum resistance) has a time constant of the order of 22. When the rheostat is moved from zero setting it first operates a switch to cut off the steady current supply to the solenoid and then it activates the pulse generator at a rate determined by the timing circuit.

12 Claims, 3 Drawing Figures

INVENTORS
HENRY L. BRILL
JAMES A. STANFORD
BY
George H. Fritzinger
AGENT

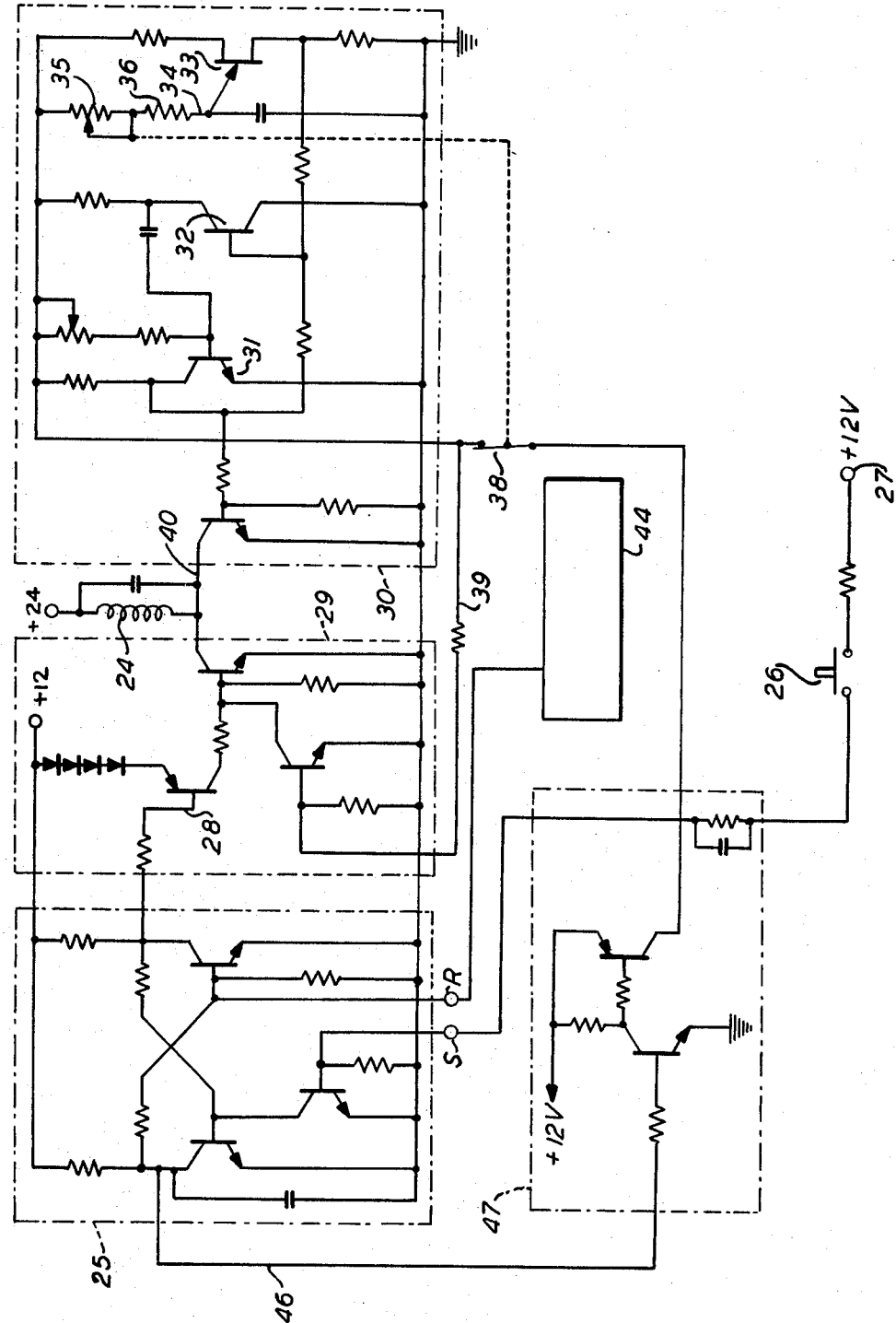

VARIABLE PROJECTOR SPEED CONTROL

An object of our invention is to provide an improved variable projector speed control utilizing a cam actuated ratchet mechanism driven through a one-revolution integrating clutch.

Another object of the invention is to provide such variable projector speed control wherein the clutch is controlled by electronic circuits.

A further object is to provide such variable speed control for a projector wherein the one-revolution integrating clutch is controlled by a solenoid actuated by a variable pulse generator of a monostable multivibrator type.

Another object is to provide such projector speed control with a flip-flop circuit which when toggled makes voltage available to drive the projector film at a variable rate and which when reset by a signal picked up from the film brings the drive to an immediate stop.

These and other objects and features of the invention will be apparent from the following description and the appended claims.

In a description of our invention reference is had to the accompanying drawings, of which:

FIG. 3 is a schematic circuit diagram of the drive control circuitry.

Figure 1:
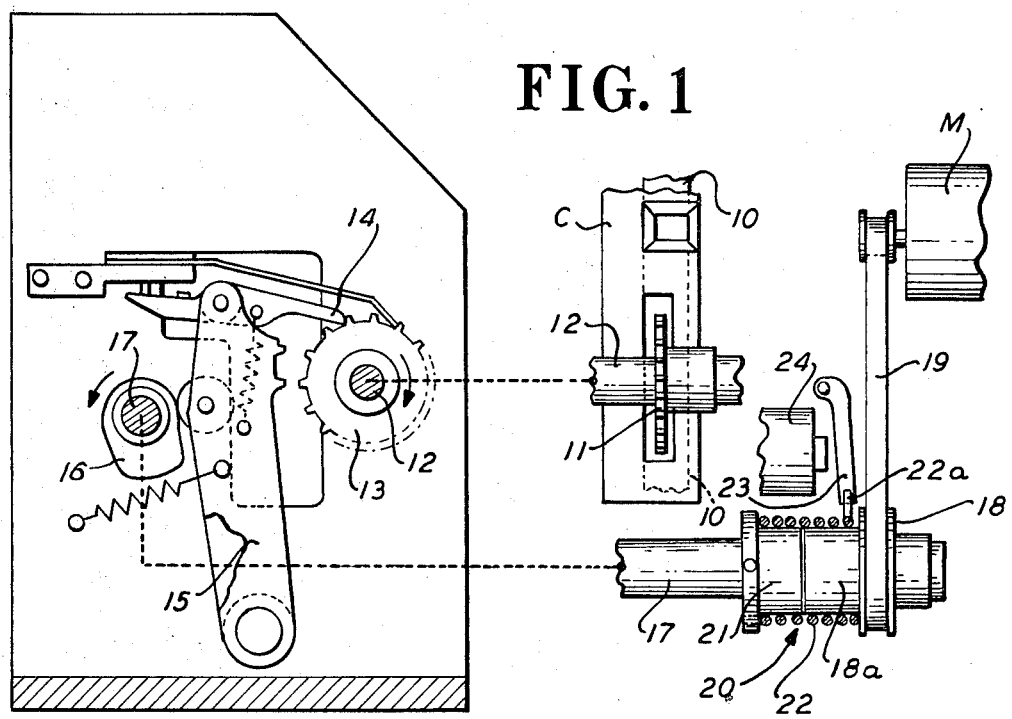
FIG. 1 is a diagrammatic layout of a drive system for a film projector according to the invention.

A motion picture projector has a film 10 which is driven by a sprocket wheel 11 mounted on a shaft 12 either in a continuous scanning mode or in a stepped projector mode. A stepped advance is accomplished by a ratchet mechanism including a ratchet wheel 13 secured to the shaft 12 and engageable by a pawl 14 pivoted on a rocker lever 15. This lever is reciprocated by a cam 16 mounted on a shaft 17. Journaled on the shaft 17 is a pulley 18 coupled to a motor M by a belt 19. The pulley 18 is connectable to the shaft 17 by a one revolution integrating clutch 20 comprising a collar 21 pinned to the shaft 17 and a coil spring 22 bridging the collar 21 and a hub 18a of the pulley 18. The coil spring binds by its own resilience to the collar and hub to connect the pulley to the shaft but when one end of the spring is blocked by a catching of an armature 23 of a solenoid 24 against the radial tang 22a of the spring, slippage between the spring and the pulley is permitted while at the same time the spring grips the shaft 17 to hold it stationary. Thus, when the solenoid is energized the shaft is rotated at a continuous speed to step the ratchet wheel ahead one tooth for each revolution of the shaft. This step motion advances the film one frame at a time. However, when the solenoid is energized by a pulse of a duration less than the time for the shaft 17 to complete one revolution, the armature is released to stop the shaft when it has completed one revolution whereby to limit the advance of the film to a single frame. For further details as to the mechanical construction of the projector drive system reference may be had to the pending Brill application Ser. No. 148,403 filed June 1, 1971, and entitled PICTURE PROJECTOR.

Figure 2:
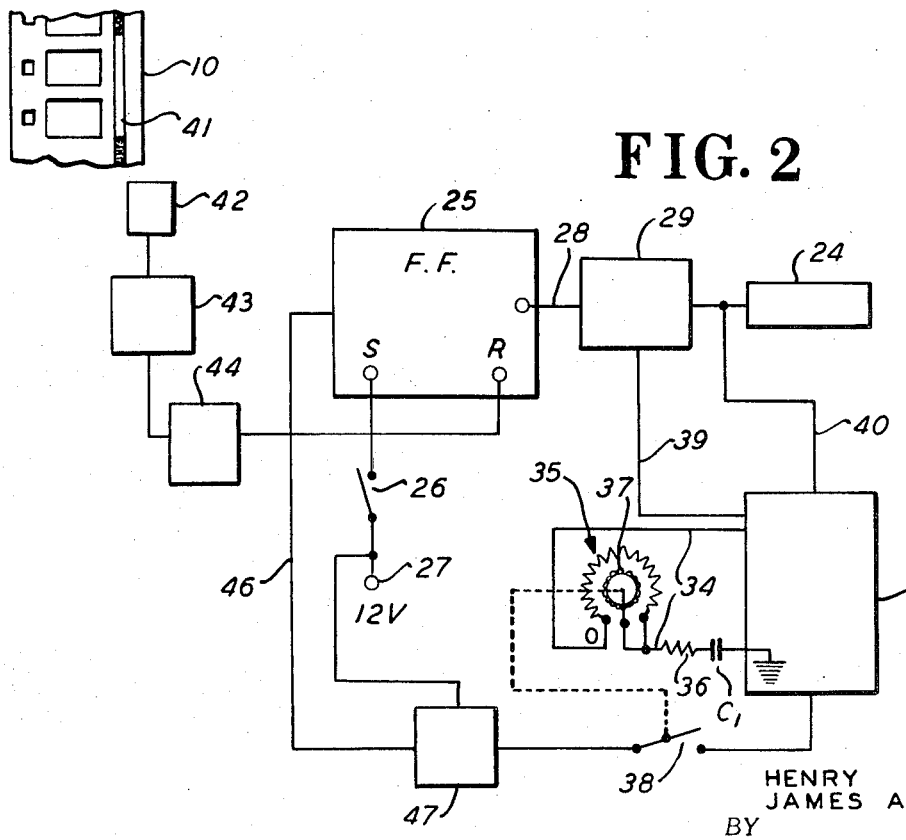
FIG. 2 is a block diagram of the electronic circuitry for controlling the clutch of the drive system.

An electrical drive control system for the present film projector is shown by the block diagram in FIG. 2 and comprising a flip-flop circuit 25 which has a set input terminal S connected via a manual "normal-motion" start switch 26 to a voltage source 27 typically 12 volts DC. When the switch 26 is closed the 12 volt supply is connected through the S input terminal to toggle the flip-flop circuit 25 and cause its output circuit 28 to drive an amplifier circuit 29 into conduction to activate the solenoid 24. At the same time the flip-flop circuit cuts off the control voltage at its second output connected to lead line 46 the effect of which is to activate a 12 volt control circuit 47 to make supply voltage available for a pulse generator 30. As the solenoid 24 was activated it withdrew the armature from the tang 22a to unblock the clutch spring 22 and start rotation of the cam shaft 27. The film is therefore stepped ahead at about 22 frames per second as above-described.

In order to provide a variable speed control the solenoid drive circuit 29 is clamped to shut off the steady current supply to the solenoid 24 and the solenoid is driven by the pulse generator 30. This pulse generator 30 comprises transistors 31 and 32 (FIG. 3) connected as a monostable multivibrator operating in conjunction with a unijunction electrical variable transistor 33 across which is a timing circuit 34 including a 2 meghom rheostat 35 in series with a fixed resistor 36 of about 39 K ohms and a condenser $C_1$ of 1 microfarad. The rheostat 35 has a control knob 37 (FIG. 2) which when in its most counterclockwise position at a zero setting shunts out the variable resistance leaving the 1/RC time constant at a maximum value of about 22. As the control knob 37 is rotated from its zero setting to introduce resistance into the time circuit a switch 38 is closed to connect the 12 volt supply to the pulse generator 30 which in the first instance feeds voltage via the switch 38 into the drive amplifier 29 to clamp this circuit and cut off the continuous current supply to the solenoid 24. Further, the closure of the switch 38 activates the pulse generator to feed pulses via an output lead 40 to the solenoid 24. These pulses are fed out at a rate determined by the timing circuit 34, the pulse being slower as the control knob is turned further to the right and reaching their lowest rate of about one every 2 seconds to advance the film about one frame every 2 seconds when the control knob is at its most clockwise position.

On the film 10 along the side of the successive frames is a stripe code 41 detected by a reader 42 feeding into a decoder 43. The decoder 43 feeds through a stop code reader 44 to the reset input terminal R of the flip-flop circuit 25. An interruption in this tripe code at a particular frame causes a pulse to be fed into the flip-flop circuit 25 to reset the circuit the effect of which is to cut off the input voltage to the drive amplifier 29 and to feed a signal via the output lead 46 to the 12 volt control circuit 47 to shut off the voltage supply to the pulse generator 30 and stop the projector on the same frame that it detects the stripe code. The projector is restarted by pressing the manual "normal-motion" start switch 26 to toggle the flip-flop circuit 24 so as to restore an input voltage again to the drive amplifier 29 and at the same time to activate the 12 volt control circuit 47 to make a supply voltage available again to the generator 30.

The embodiment of our invention herein particularly shown and described is intended to be illustrative and not necessarily limitative of our invention since the same is subject to changes and modifications without departure from the scope of our invention, which we endeavor to express according to the following claims.

We claim:

1. In a motion picture projector having a film with successive image frames therealong, a drive system for intermittently advancing said film at varying speeds by the step distance between successive frames including a drive pawl to produce a step advance of the film for each reciprocation thereof, pulsing means, means controlled by said pulsing means for producing successive reciprocations of said pawl, and adjustable means for varying the time interval between said successive pulses.

2. The projector set forth in claim 1 wherein said drive means includes a rotatable cam for reciprocating said drive pawl, a drive motor for said cam, and an integrating clutch actuated by said pulsing means and connected between said motor and cam for producing a reciprocation of said drive pawl for each of said pulses.

3. The projector set forth in claim 2 wherein said cam is adapted to produce one reciprocation of said drive pawl for each revolution of the cam, and said integrating clutch is of a one-revolution type including a solenoid controlled by said pulsing means for controlling the clutch.

4. The projector set forth in claim 3 wherein said clutch includes a coupling spring with a single catch element and a cooperating latch for holding the clutch disengaged, and wherein said solenoid is actuated by each pulse of said pulsing means for an interval less than the time duration of one revolution of said cam to produce one step advance of said film for each pulse.

5. The projector set forth in claim 4 wherein said pulsing means is a monostable multivibrator operating in conjunction with a variable-resistance unijunction transistor, including an RC timing circuit having a rheostat for varying the time interval between successive pulses over a range from approximately 24 pulses per second to a lower limit of one pulse for each half second.

6. The projector set forth in claim 5 including a start switch for supplying continuous current to said solenoid to produce a step advance of said film at the rate of drive of said cam by said motor, an on-off switch for said pulsing means, and means rendered operative as said rheostat of said timing circuit is moved from minimum setting for closing said on-off switch to start said pulsing means and for concurrently cutting off said continuous current supply to said solenoid whereby to cause said solenoid to be controlled solely by said pulsing means.

7. In a motion picture projector having a film with successive image frames and sprocket holes: the combination of a drive means engageable with said film including a rotating drive shaft and a single revolution integrating clutch for advancing the film by one frame per revolution of said shaft, said clutch including a latch pawl and a single cooperating catch element for holding the clutch disengaged and for engaging the clutch for one revolution of the shaft responsive to a momentary release of the pawl for a time interval less than that of one revolution, a solenoid for releasing said pawl, means for supplying a voltage to said solenoid to cause said film to be advanced at a steady rate of one frame for each revolution of said shaft, a drive amplifier between said voltage supply means and said solenoid having a clamp circuit energizable to cut off the amplifier, a pulse generator for alternatively activating said solenoid to step said film ahead at a rate of one frame for each pulse of said generator, and an on-off switch for said generator for activating said generator and concurrently clamping said amplifier when the switch is in on position and for stopping said generator and reabling said amplifier when the switch is in off position.

8. The combination set forth in claim 7 wherein said generator includes a variable time circuit having a rheostat movable from a minimum setting to lower progressively the rate of said pulse generator, and means for turning said generator switch on and off as said rheostat is moved out of and back into said minimum setting.

9. The combination set forth in claim 8 wherein said generator is adapted to provide a pulse rate approximately equal to the rate of rotation of said shaft when said rheostat is at minimum setting.

10. The combination set forth in claim 7 including a flip-flop circuit having first and second outputs for supplying DC voltages at the first and second outputs respectively when the circuit is toggled and reset, said first output being connected to said amplifier to supply said DC voltage to said solenoid when the flip-flop circuit is in a toggled condition, an electronic switch having a control connection to said second output of said flip-flop circuit for cutting off the voltage supply for said generator and clamp circuit when the flip-flop circuit is in a reset condition, and means for toggling said flip-flop circuit for providing a steady activation of said solenoid to cause said film to be advanced at the rate of rotation of said shaft when said generator switch is in off position and for closing said electronic switch to cause said film to be advanced at the rate of pulsing of said generator when said generator switch is in on position.

11. The combination set forth in claim 10 including means for picking up a signal from said film at a predetermined frame for resetting said flip-flop circuit to cut off the steady current to said solenoid and to shift said electronic switch to open condition to stop the drive of said film when said predetermined frame is reached.

12. The combination set forth in claim 11 wherein said toggling means comprises a manual start switch connected to a set input terminal of said flip-flop circuit.

* * * * *